Figure 1:
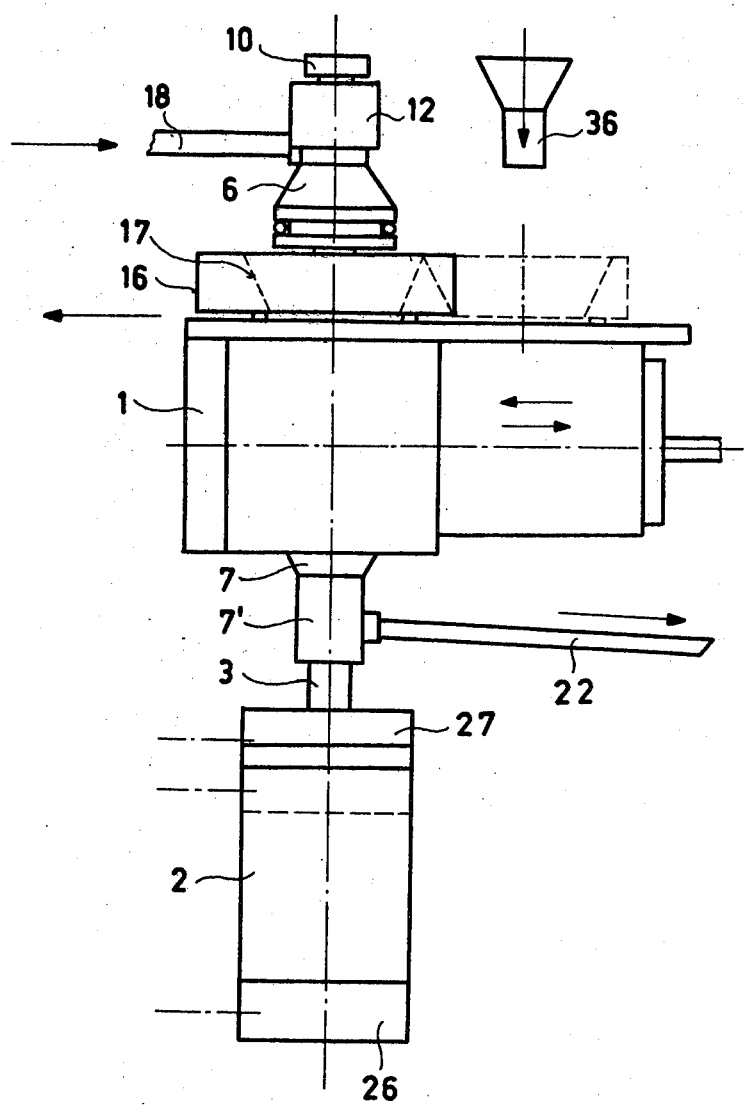

United States Patent [19]

Dremmel

[11] Patent Number: 4,457,216
[45] Date of Patent: Jul. 3, 1984

[54] METHOD FOR PRODUCING COFFEE AND COFFEE MACHINE FOR CARRYING OUT THE METHOD

[75] Inventor: Engelbert Dremmel, Nottwil, Switzerland

[73] Assignee: Kurt Rost, Frieslirain, Switzerland

[21] Appl. No.: 385,411

[22] PCT Filed: Sep. 29, 1981

[86] PCT No.: PCT/CH81/00107
  § 371 Date: May 20, 1982
  § 102(e) Date: May 20, 1982

[87] PCT Pub. No.: WO82/01120
  PCT Pub. Date: Apr. 15, 1982

[30] Foreign Application Priority Data
Mar. 10, 1980 [CH] Switzerland ............ 7378/80

[51] Int. Cl.³ ............................................. A47J 31/00
[52] U.S. Cl. ................................... 99/287; 99/289 R; 426/433
[58] Field of Search ............... 99/287, 289 R, 289 P, 99/297, 292; 426/433

[56] References Cited

U.S. PATENT DOCUMENTS 3,266,410 8/1966 Novi ............................. 99/287
3,369,478 2/1968 Black ........................... 99/298
3,760,712 9/1973 Rossi ........................... 99/289

FOREIGN PATENT DOCUMENTS

| 2053466 | 3/1971 | Fed. Rep. of Germany ...... 99/289 |
| 1364875 | 5/1964 | France . |
| 2069284 | 9/1971 | France . |
| 2117193 | 7/1972 | France . |
| 2156467 | 6/1973 | France . |
| 2226137 | 11/1974 | France . |
| 521115 | 5/1972 | Switzerland . |
| 590041 | 7/1977 | Switzerland . |

Primary Examiner—Robert W. Jenkins
Attorney, Agent, or Firm—Pollock, Vande Sande & Priddy

[57] ABSTRACT

Apparatus for obtaining strong aromatic coffee having a scalding chamber within a cylinder for receiving coffee powder between separately controlled upper and lower pistons, a hydraulic piston for causing the upper piston to close the scalding chamber, a passage for introducing hot water into the closed chamber through the upper piston so as to cause the coffee powder to swell-up, a separate hydraulic piston for causing the lower piston to compress the swollen coffee, and a passage for draining off the coffee so formed through the lower piston.

12 Claims, 7 Drawing Figures

METHOD FOR PRODUCING COFFEE AND COFFEE MACHINE FOR CARRYING OUT THE METHOD

TECHNICAL FIELD

The present invention concerns a coffee machine for producing liquid coffee from coffee powder.

BACKGROUND OF THE INVENTION

Coffee machines are known in a number of different embodiments. Some of these are automatic machines operating with two pistons moving synchronously. In these cases, the quantity of coffee powder though predetermined is not scalded in a loose state with hot water; the result being that the relatively roughly ground coffee powder fails to properly swell-up, causing the aroma to suffer thereby. Therefore, a larger quantity of coffee powder is needed for obtaining and aromatically stronger coffee.

SUMMARY OF THE INVENTION

The invention has as its object the scalding of finely pulverized, loose coffee powder by means of working pistons moving independently of each other in a scalding chamber for thus obtaining aromatically strong coffee from a relatively small quantity of coffee powder. According to the invention, this object is achieved by using a coffee machine having the claimed features. In addition, separately actuated working pistons meter the quantity of coffee powder and thus predetermine the aromatic strength of the coffee produced.

A BRIEF DESCRIPTION OF THE DRAWINGS

Figure 2:
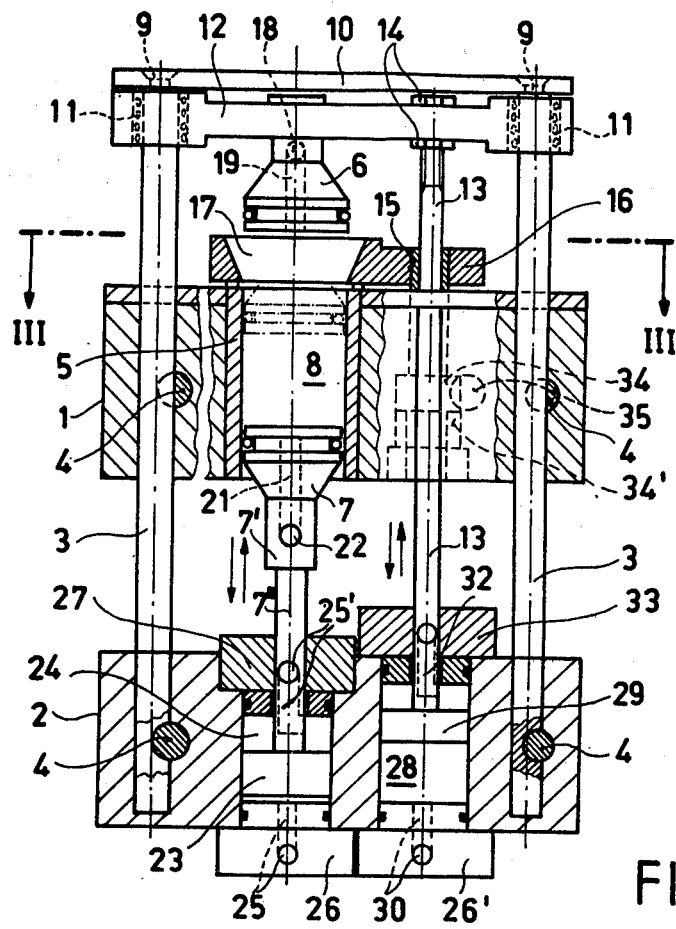
Figure 3:
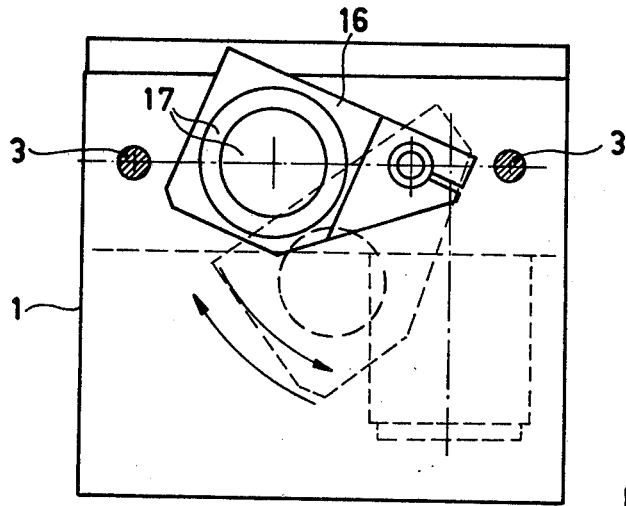
Figure 4:
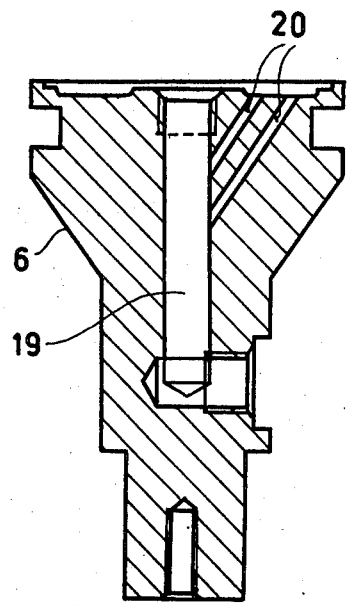
Figure 6:
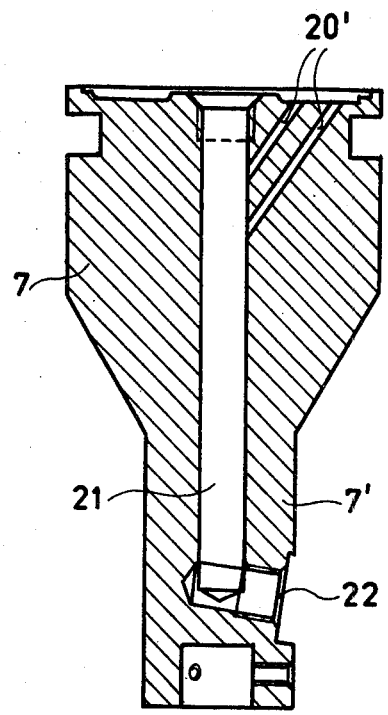
Figure 5:
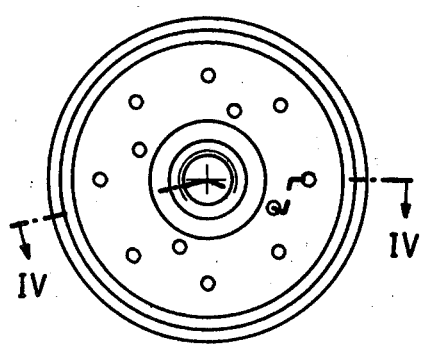
Figure 7:
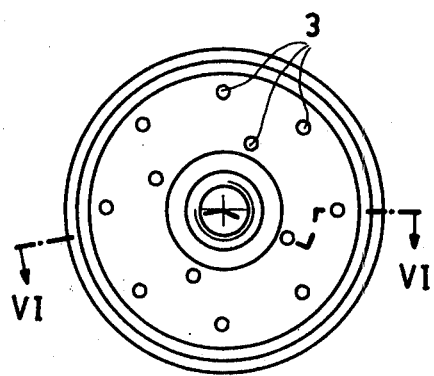

The attached drawings show an exemplary embodiment of the coffee machine as described below in the description of the best mode embodiment. In particular, FIG. 1 shows a lateral view of the coffee machine, FIG. 2 shows a vertical sectional view, FIG. 3 shows a sectional view taken along line III—III of FIG. 2, FIG. 4 shows a vertical sectional view of the upper working piston on taken along line IV—IV of FIG. 5, turned by 180°, FIG. 5 shows a top view of the upper working piston of FIG. 4, FIG. 6 shows a vertical sectional view of the lower working piston taken along line VI—VI of FIG. 7, FIG. 7 shows a top view of the lower working piston of FIG. 6.

DESCRIPTION OF THE BEST MODE EMBODIMENT

Two spaced horizontal carrier plates 1, 2 and two vertical rods 3 constitute the machine frame. The carrier plates 1, 2 are fixedly positioned in relation to the vertical rods by means of bolts 4 engaging grooves provided on the rods 3. A cylinder 5 open both at its upper and its lower end is fixedly mounted within the carrier plate 1. Two pistons, an upper piston 6 and a lower piston 7, are arranged to penetrate the cylinder 5. FIGS. 1 and 2 of the drawing show the upper piston 6 spaced vertically above the cylinder 5. The lower piston 7, on the other hand, partially engages the cylinder 5, being thus in a state of working readiness. When lowered, the piston 6 assumes the position indicated in FIG. 2 by dotted lines and closes the cylinder 5 at the upper end thereof. The space between the pistons 6 and 7 and the inside wall of the cylinder 5 defines a scalding chamber 8 destined to receive the coffee powder from which coffee is intended to be extracted. The outer dimensions of the pistons 6 and 7 are fitted to the inner diameters of the cylinder 5 and the scalding chamber 8. A traverse 10 is fixedly mounted by means of screws 9 to the upper ends of the vertical rods 3. An entrainer 12 provided with ball bearings 11 and displaceable in the vertical direction is positioned on the vertical rods 3. A guide rod 13 fixedly mounted on the entrainer 12 by means of screws 14 is arranged to pass through the carrier plate 1 and to partially engage the carrier plate 2. The guide rod 13 is surrounded by an entrainer bushing 15, which carries a pivot member 16 above the carrier plate 1. Upon rotation of the entrainer bushing 15 the pivot member 16 is taken along and is brought in position above the cylinder 5 or outside of the same. The pivot member 16 is provided with a conical bore 17 downwardly decreasing in diameter, its smallest diameter being equal to the diameter of the scalding chamber 8 within the cylinder 5. A water supply conduit 18, communicating with the passage 19 and opening into the lower side of the piston 6 as shown in FIG. 4, is connected to the piston 6. Lateral distributing channels 20 leading to the lower side of the upper piston 6 depart from the passage 19. The lower piston 7 has a shaft portion 7' provided with a central passage 21 arranged to communicate with a coffee drain conduit 22. The conduits 18 and 22 are both suitably flexible and consist of plastic or metal.

Mounted on a push rod 7" fixedly connected to the piston 7 is a piston disc 23 arranged within a pressure chamber 24 within the carrier plate 2. An oil channel 25 originates in the closure plate 26 and opens into the pressure chamber 24. A further oil channel 25' originates in the closure plate 27 and leads into the pressure chamber 24 from above. The oil channels 25, 25' are arranged to communicate by way of conduits with an oil pressure generator of known type and not separately shown in the drawing. The guide rod 13 penetrates below into a pressure chamber 28 arranged within the carrier plate 2. The guide rod 13 is provided with a piston disc 29 which reciprocates within the pressure chamber 28 and has the function of vertically displacing the entrainer 12 with the piston 6. The reference numeral 30 refers to an oil channel originating in the closure plate 26' and leading to the pressure chamber 28. An oil channel 32 leads form the closure plate 33 to a pressure source not separately shown. The piston 7 is also provided with distributor channels 20' leading from its upper side to the central passage 21. Mounted above the upper carrier plate 1 on the bearing 34' is a toothed gear 34 engaged by a toothed rack 35 displaceable transversely to the guide rod 13. The toothed rack 35 is displaceable within certain limits in both directions by means of conventional, oil-pressure controlled and piston-operated actuating elements not separately shown in the drawing. In the course of such displacement, the pivot member 16, which enables coffee powder to be fed into the cylinder 5 and later the coffee powder pushed out by the piston to be carried away, is taken along. The pivot member 16 may be set in position below the coffee powder feeder 36, as indicated in FIG. 1 with dashed lines, for filling the bore 17 with coffee powder, or else over the cylinder 5, as shown in FIG. 2.

The pistons 6, 7 and the rack 35 for positioning the pivot member 16 are hydraulically actuated in independent manner.

The coffee machine with its components for carrying out various motions and functions is controlled by electronic devices of known types.

Coffee is made by introducing loose coffee powder into the scalding chamber 8 between the two separately controlled pistons 6 and 7. Subsequent to introducing the loose coffee powder into the scalding chamber, the latter is closed by lowering upper piston 6 and hot water is supplied through the upper piston 6. The coffee powder is then allowed to swell-up so as to obtain strong aromatic coffee from a relatively small quantity of coffee powder. Compression is then applied to the swollen coffee powder by sliding lower piston 7 into the scalding chamber 8. The coffee so formed is drained off through the central passage 21 in this lower piston. Finally, the upper piston 6 is removed from the scalding chamber and the compressed coffee powder is pushed out of the upper end of cylinder 5 by sliding the lower piston 7 further into the scalding chamber. After the compressed coffee powder has been pushed out of cylinder 5 by lower piston 7, it is carried away by displacement of pivot member 16.

I claim:

1. A coffee machine comprising:
   upper and lower pressure pistons arranged to move independently in opposite directions within a cylinder, said cylinder being open at both ends so that said upper piston and said lower piston are freely removable out of engagement with said cylinder;
   two carrier plates mounted on vertical rods one above the other in spaced relation;
   a scalding chamber for receiving loose coffee powder, said scalding chamber comprising said cylinder and said lower piston within said cylinder, and said cylinder being embedded in one of said carrier plates;
   hydraulic means carried by the other of said carrier plates for actuating said pressure pistons independently of each other between a ready position and a working position, said upper piston in its ready position being slidable into said cylinder to close said scalding chamber and said lower piston in its ready position being slidably further into said cylinder to compress said coffee powder; and,
   a hot water conduit leading to said closed scalding chamber and a coffee outflow conduit leading from said closed scalding chamber.

2. A coffee machine according to claim 1 in which said upper and lower pistons each have a central passage and a plurality of distributor channels connecting said central passage to a surface of the piston comprising a part of said scalding chamber.

3. A coffee machine according to claim 1 in which said lower piston may be brought to rest in the space between said carrier plates so as to be accessible from outside of said coffee machine.

4. A coffee machine according to claim 1 which further comprises a pivot member having a bore for receiving and supplying coffee powder, said pivot member being arranged for pivotal movement between a receiving position in which said bore receives coffee powder from a source of supply and a supply position in which said bore supplies coffee powder to the top of said cylinder; a surface member underlying said bore when said pivot member is away from said supply position; a rotatably mounted turning rod engaging said pivot member for pivotal movement; and means for rotating said turning rod so as to cause said pivot member to move between said receiving position and said supply position.

5. A coffee machine according to claim 1 in which said upper piston is fixedly connected to an entrainer member supported on vertical rods for reciprocal movement upward and downward relative to said carrier plate with said embedded cylinder, said entrainer member being connected to a guide rod mounted for vertical reciprocation relative to said carrier plate with said embedded cylinder; and piston means for causing vertical reciprocation of said guide rod so as to move said entrainer member upward and downward relative to the carrier plate with said embedded cylinder.

6. A coffee machine according to claim 1 in which said hot water conduit includes a hot water passage through said upper piston, and said coffee outflow conduit includes an outflow passage through said lower piston.

7. A coffee machine according to claim 6 in which a flexible hot water supply conduit is connected to said hot water passage in said upper piston, and a flexible coffee drain conduit is connected to said outflow passage in said lower piston.

8. A coffee machine according to claim 1 in which said lower piston includes an axial passage, and in which said coffee machine further comprises a flexible coffee drain conduit connected to said axial passage and arranged for movement along with said lower piston.

9. A coffee machine comprising:
   two separately controlled pistons arranged for movement independently and in spaced relation to each other within a cylinder, said upper piston having a ready position above the upper end of said cylinder and said lower piston having a ready position within said cylinder to define a scalding chamber for receiving loose coffee powder;
   first actuating means for causing said upper piston to slide into said cylinder so as to close said scalding chamber;
   means for providing hot water in said closed scalding chamber so as to cause said loose coffee powder to swell-up;
   second actuating means for causing said lower piston to slide further into said scalding chamber so as to compress said swollen coffee powder, said upper piston being controlled by said first actuating means so that it is removed from said cylinder and said lower piston being controlled by said second actuating means so that it pushes said compressed coffee powder out of the upper end of said cylinder after said coffee powder has been compressed;
   means for drawing off coffee from said scalding chamber as said coffee powder is being compressed by said lower piston; and,
   means for removing compressed coffee powder pushed out of said cylinder by said lower piston and for providing fresh coffee powder in said scalding chamber.

10. A coffee machine according to claim 9 in which said cylinder is open at both ends so that said upper piston and said lower piston are freely removable out of engagement with said cylinder.

11. A coffee machine according to claim 9 in which said upper and lower pistons each have a central passage and a plurality of distributor channels connecting said central passage to a surface of the piston comprising a part of said closed scalding chamber.

12. A coffee machine according to claim 11 in which said lower piston may be brought to rest in the space between said carrier plates so as to be accessible from outside of said coffee machine.

* * * * *